United States Patent [19]
O'Donnell et al.

[11] Patent Number: 5,788,948
[45] Date of Patent: Aug. 4, 1998

[54] PROCESS FOR THE PRODUCTION OF FLUOROMETALLATE SALTS USEFUL IN THE PROCESSING OF MINERAL SANDS AND RELATED MATERIALS

[75] Inventors: Thomas Aloysius O'Donnell, Burwood; John Besida, Yarraville; Teresa Kit Hing Pong, Coburg; David George Wood, St. Kilda, all of Australia

[73] Assignee: The University of Melbourne, Victoria, Australia

[21] Appl. No.: 434,166

[22] Filed: May 3, 1995

Related U.S. Application Data

[60] Continuation-in-part of Ser. No. 377,103, Jan. 23, 1995, Pat. No. 5,482,691, which is a division of Ser. No. 107,787, Oct. 22, 1993, Pat. No. 5,397,375.

[51] Int. Cl.[6] .................. C01B 9/00; C01B 9/08; C01D 3/16; C01G 23/02
[52] U.S. Cl. .................. 423/463; 423/464; 423/72; 423/185
[58] Field of Search ................. 423/464, 463, 423/72, 185

[56] References Cited

U.S. PATENT DOCUMENTS

| | | | |
|---|---|---|---|
| 2,832,731 | 4/1958 | Cunningham | 423/464 |
| 3,653,850 | 4/1972 | Eberts | 423/464 |
| 5,482,691 | 1/1996 | O'Donnell et al. | 423/69 |

FOREIGN PATENT DOCUMENTS

| | | | |
|---|---|---|---|
| 61-58814 | 3/1986 | Japan | 423/464 |
| 1044025 | 9/1966 | United Kingdom | 423/72 |
| 94/05600 | 3/1994 | WIPO | 423/464 |

*Primary Examiner*—Steven Bos
*Attorney, Agent, or Firm*—Sughrue, Mion, Zinn, Macpeak & Seas, PLLC

[57] ABSTRACT

The present invention relates to a process for the production of intermediates useful in the processing of mineral sands and related materials characterized in that the process comprises:

(a) dissolving a metal fluoride or metal chloride compound in an organic solvent; and either (b)(i) adding an ammonium fluoride to the metal fluoride or metal chloride compound dissolved in the organic solvent in step (a) to precipitate an ammonium fluorometallate from the organic solvent; and (ii) dissolving the ammonium fluorometallate from step (b)(i) in water and adding an alkali fluoride or an alkali chloride or an alkali nitrate to produce an alkali fluorometallate and an ammonium fluoride or an ammonium chloride or an ammonium nitrate; or (c) optionally adding the metal fluoride compound dissolved in the organic solvent in step (a) to an alkali fluoride dissolved in water or in aqueous hydrogen fluoride to produce an alkali fluorometallate directly.

31 Claims, 1 Drawing Sheet

PROCESS FOR THE PRODUCTION OF FLUOROMETALLATE SALTS USEFUL IN THE PROCESSING OF MINERAL SANDS AND RELATED MATERIALS

CROSS REFERENCE TO RELATED APPLICATIONS

This is a Continuation-in-Part Application of application Ser. No. 08/377/103, filed Jan. 23, 1995, now U.S. Pat. No. 5,482,691 which is a Divisional of Ser. No. 08/107,787 filed Oct. 22, 1993, now U.S. Pat. No. 5,397,375, the disclosure of which is incorporated herein.

FIELD OF THE INVENTION

The invention relates to processes for the production of intermediates useful in the processing of mineral sands and related materials. In particular, the invention relates to the purification of tetravalent halides of metals, such as titanium and zirconium fluorides or chlorides, and their safe and easy conversion to complex fluoride salts.

BACKGROUND OF THE INVENTION

Various processes exist for treating mineral sands and related materials to produce the tetravalent halides of metals through a fluoridation or chlorination step. The metal halides produced from the ore usually contain small quantities of impurities, such as metal oxides or other metal halides, which must be separated. Furthermore, metal halides such as $TiF_4$ and $TiCl_4$ are difficult to handle because they readily react with moisture in the air to form oxides. The present invention provides a route for isolating the metal halides of interest in a pure form in solution, and then converting them to complex fluoride salts. The complex fluoride salts may subsequently be processed to produce high purity metal oxides or metals.

In the process for the production of pigment grade $TiO_2$, the purified tetravalent metal halides are usually converted to metal oxides in an oxidation or hydrolysis step. For the chloride process, the oxidation of $TiCl_4$ to $TiO_2$ is carried out at about 1000° C., and the metal oxide produced is refractory in nature which leads to difficulties in the downstream treatment stages. The aqueous hydrolysis of metal fluorides may be performed under relatively mild conditions, however, corrosive aqueous HF is generated in the reaction leading to high equipment costs and contamination problems.

On a laboratory scale, the complex fluoride salts of metals such as titanium and zirconium are usually prepared by dissolving the metal oxides in aqueous hydrofluoric acid followed by the addition of an alkali metal salt such as a carbonate or hydroxide. The products prepared in this way can be contaminated with residual oxides and oxide fluorides.

A requirement accordingly exists to provide an improvement on existing processes by employing a non-aqueous route to the preparation of pure ammonium fluorometallate salts and to then convert these salts to substantially pure alkali fluorometallate salts.

This has been achieved by purifying the metal halides by dissolution in an organic solvent in which contaminants such as oxides and oxide halides are insoluble. The soluble halides are then precipitated from this solvent as complex fluoride salts having a high purity.

SUMMARY OF THE INVENTION

According to the present invention there is provided a process for the production of intermediates useful in the processing of mineral sands and related materials characterized in that the process comprises:

(a) dissolving a molecular binary metal fluoride or metal chloride compound in an organic solvent; and either (b)(i) adding an ammonium fluoride to the metal fluoride or metal chloride compound dissolved in the organic solvent in step (a) to precipitate an ammonium fluorometallate from the organic solvent; and (ii) dissolving the ammonium fluorometallate from step (b)(i) in water and adding an alkali fluoride or an alkali chloride or an alkali nitrate to produce an alkali fluorometallate and an ammonium fluoride or an ammonium chloride or an ammonium nitrate; or (c) optionally adding the metal fluoride compound dissolved in the organic solvent in step (a) to an alkali fluoride dissolved in water or in aqueous hydrogen fluoride to produce an alkali fluorometallate directly.

BRIEF DESCRIPTION OF THE DRAWING

A particularly preferred embodiment of the process of the invention is shown in FIG. 1.

DETAILED DESCRIPTION OF THE INVENTION

Figure 1:
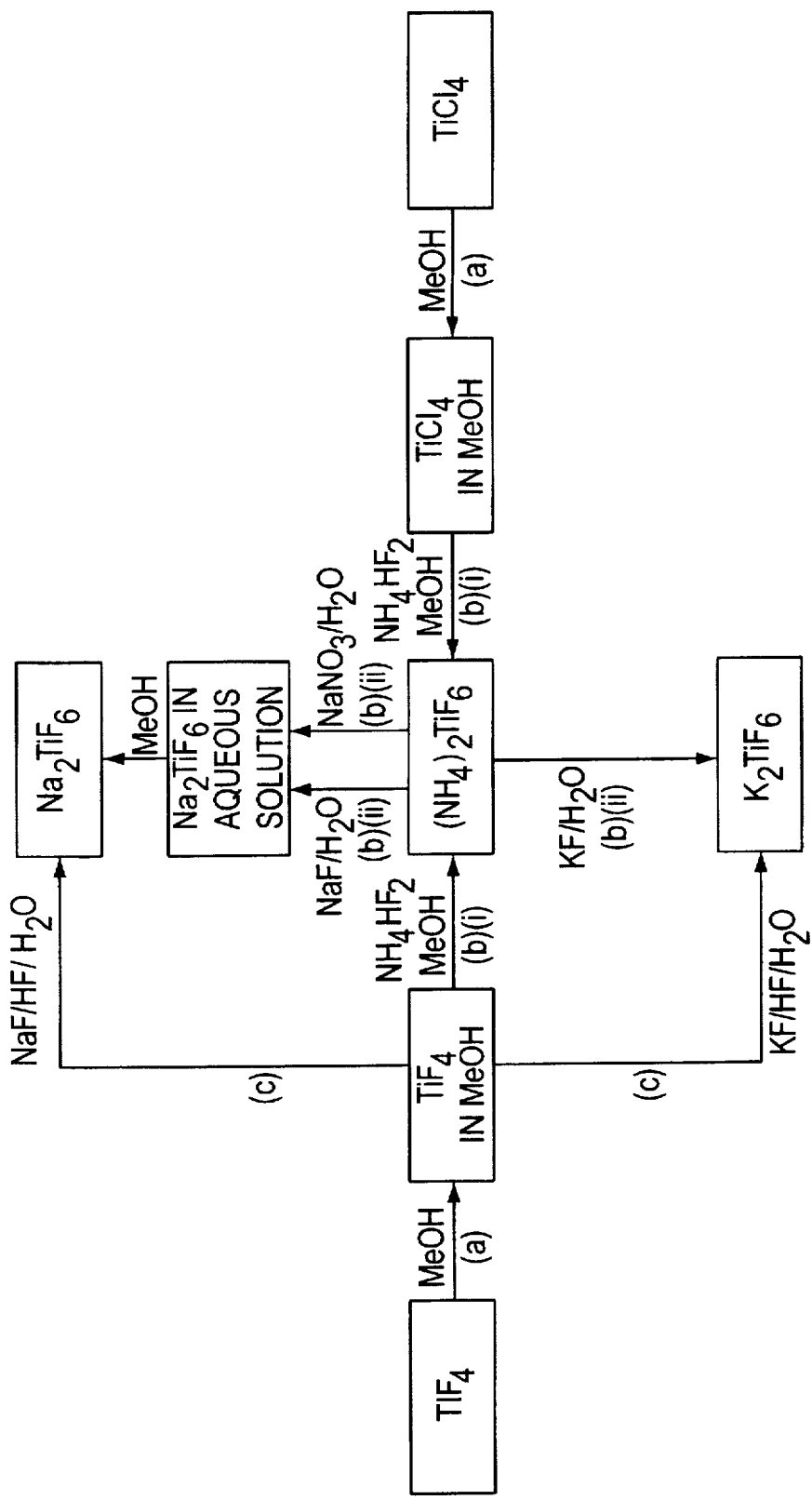

The mineral sands and related materials may include, for example, ilmenite and other titaniferous ores such as rutile, titaniferous slags or zircon.

The organic solvent from step (b)(i) may be optionally recycled to step (a), and the ammonium fluoride from step (b)(ii) may be optionally recycled to step (b)(i).

Preferably the molecular binary metal fluoride or chloride compound in step (a) is selected from titanium tetrafluoride, titanium tetrachloride, zirconium tetrafluoride, zirconium tetrachloride, tin tetrafluoride or tin tetrachloride.

The metal fluoride compound in step (a) is often contaminated with impurities such as metal oxides, metal oxidehalides or other non-volatile metal halides. For example, during the fluoridation of titaniferous ores, the titanium tetrafluoride may be contaminated with titanium oxide, titanium oxide fluoride, and iron fluoride. Since the metal fluoride in step (a) is essentially molecular in nature and as such is soluble in an appropriate organic solvent, whereas the impurities are not, these impurities can be separated from the titanium fluoride compound by dissolving the mixture in an organic solvent. The impurities, remaining as a solid residue after treatment with the organic solvent, can be separated for further processing or disposal.

The organic solvent in step (a) may be an alcohol, such as, for example, methanol, ethanol or isopropanol or any other non-aqueous medium in which contaminants are insoluble.

Preferably the ammonium fluoride in step (b)(i) is selected from ammonium fluoride ($NH_4F$) or ammonium bifluoride ($NH_4HF_2$).

The ammonium fluorometallate produced in step (b)(i) may be ammonium fluorotitanate, such as, for example, ammonium hexafluorotitanate (($NH_4)_2TiF_6$) or ammonium fluorozirconate, such as, for example, ammonium heptafluorozirconate (($NH_4)_3ZrF_7$) and ammonium hexafluorozirconate (($NH_4)_2ZrF_6$) or ammonium hexafluorostannate (($NH_4)_2SnF_6$).

Preferably the alkali fluoride in step (b)(ii) is potassium fluoride (KF), sodium fluoride (NaF) or lithium fluoride (LiF).

The alkali fluorometallate produced in steps (b)(ii) or (c) may be $K_2TiF_6$, $K_2ZrF_6$, $K_2SnF_6$, $Na_2TiF_6$, $Na_2ZrF_6$, $Na_2SnF_6$, $Li_2TiF_6$, $Li_2ZrF_6$, $Li_2SnF_6$, $K_3ZrF_7$, $Na_3ZrF_7$ or $Li_3ZrF_7$.

The alkali fluorometallate from step (b)(ii) may be isolated by any suitable known technique, such as, for example, by adding an organic solvent such as an alcohol, for example, methanol, ethanol or isopropanol or any other non-aqueous medium miscible with water to precipitate the alkali fluorometallate.

In an alternative process, water and optionally base is added to the metal fluoride compound dissolved in the organic solvent in step (a) to produce a hydrated metal oxide. The hydrated metal oxide product from the alternative process may be treated to produce, for example, a metal oxide pigment or a refractory ceramic.

Preferably the alkali fluoride in step (c) is sodium fluoride (NaF), potassium fluoride (KF), or lithium fluoride (LiF).

In a further alternative process, the ammonium fluorometallate from step (b)(i) is pyrohydrolyzed to produce a hydrated metal oxide, an ammonium fluoride and hydrogen fluoride, each of which may be recycled into the process.

The further alternative process may be performed using any suitable pyrohydrolysis technique. In a particularly preferred embodiment, a flow system having air with entrained water vapour may be streamed over a bed of the ammonium fluorometallate at temperatures sufficiently low to prevent sublimation of, for example, $TiF_4$ from a fluorotitanate (200°–300° C.) or $ZrF_4$ from a fluorozirconate (450°–500° C.). After an appropriate reaction time, typically 4 to 5 hours, the residues are hydrated $TiO_2$ or $ZrO_2$. Volatile HF and $NH_4F$ are carried out of the reaction zone in the air stream and may be condensed separately to form solid $NH_4F$, $NH_4HF_2$ and an aqueous solution of HF. The solid $NH_4F$ or $NH_4HF_2$ ay be optionally recycled in step (b)(i) or alternatively, according to the present invention may be dissolved in an organic solvent, preferably methanol, and treated with $SiO_2$ to form a precipitate of ammonium hexafluorosilicate. The $(NH_4)_2SiF_6$ may be dissolved in water and treated with KF or NaF to form $K_2SiF_6$ or $Na_2SiF_6$ and an ammonium fluoride which may be recycled.

The aqueous HF solution may be treated with $SiO_2$ and KF or NaF to form $K_2SiF_6$ or $Na_2SiF_6$ which may be recovered and heated to about 600° to 700° C. to yield $SiF_4$ which is recycled to a mineral sand reactor bed to produce further $TiF_4$ and $ZrF_4$ as disclosed in Australian Patent Application No. 48186/90. The KF or NaF residues maybe recycled to step (c). 100% recovery of $TiO_2$ or $ZrO_2$ and all of the fluoride in the compounds volatilized during pyrohydrolysis has been demonstrated experimentally for pyrohydrolysis of $(NH_4)_2TiF_6$ and $(NH_4)_3ZrF_7$ under such conditions.

The $TiO_2$ and $ZrO_2$ produced by the pyrohydrolysis in the further alternative process are hydrated and therefore more chemically reactive than the $TiO_2$ and $ZrO_2$ obtained from conventional processes. In the conventional processing of ilmenite and related minerals such as zircon, high-temperature oxidation or hydrolysis reactions are used to convert intermediates into titanium dioxide ($TiO_2$) or zirconium dioxide ($ZrO_2$). In the chloride process for pigment-grade $TiO_2$ production, titanium tetrachloride ($TiCl_4$) is burned in oxygen above 1000° C. to produce $TiO_2$. In the conventional production of $ZrO_2$, zircon is fused with alkaline materials at about 1000° C. and then leached with aqueous solution. Sometimes the zircon is preheated by plasma techniques to about 2000° C. before leaching. As a result the $TiO_2$ and $ZrO_2$ products obtained in these conventional processes are chemically refractory and not particularly amenable to subsequent purification or other processing.

Preferably the alkali fluoride in step (c) is sodium fluoride (NaF) or potassium fluoride (KF) or lithium fluoride (LiF).

The invention is further described in and illustrated by the following Examples. These Examples are not to be construed as limiting the invention in any way.

EXAMPLE 1

3.60 g of a commercial sample of crude $TiF_4$, containing large amounts of titanium oxidefluoride as an impurity, was stirred for several hours in methanol. The resulting solution was separated from the white insoluble residue and added to a saturated solution of $NH_4HF_2$ in 250 ml of methanol. An insoluble white precipitate of $(NH_4)_2TiF_6$ was formed immediately. After filtration, washing with methanol and drying in air, the mass of $(NH_4)_2TiF_6$ was 5.10 g, corresponding with an initial weight of 3.19 g of $TiF_4$ in the crude starting sample.

This example demonstrates the ease of recovery of $(NH_4)_2TiF_6$ from $TiF_4$ and the efficiency of the separation by dissolution in methanol of $TiF_4$ from accompanying oxide-fluorides.

EXAMPLE 2

0.638 g of a commercial sample of crude $TiCl_4$ was added to 0.939 g of $NH_4HF_2$ dissolved in 80 ml of methanol. An insoluble white precipitate of $(NH_4)_2TiF_6$ was formed immediately. The solid was collected by filtration, washed with methanol and dried in air. The mass of $(NH_4)_2TiF_6$ was 0.534 g, corresponding to an 80% conversion.

EXAMPLE 3

A solution consisting of 0.129 g of $TiF_4$ dissolved in 20 ml of methanol, obtained from crude $TiF_4$ as in Example 1, was added to a solution consisting of 0.089 g of NaF dissolved in 10 ml of water and 1 ml of 40% w/w aqueous HF. A white precipitate of $Na_2TiF_6$ was formed immediately and this was collected by filtration, washed with methanol and dried in air at 120° C. 0.197 g of $Na_2TiF_6$ was recovered.

EXAMPLE 4

A solution consisting of 0.129 g of $TiF_4$ dissolved in 20 ml of methanol, obtained from crude $TiF_4$ as in Example 1, was added to 0.169 g of $KHF_2$, dissolved in 20 ml of water. A white gelatinous precipitate of $K_2TiF_6$ was formed immediately. The solid was collected by filtration, washed with methanol and dried in air at 120° C. 0.229 g of $K_2TiF_6$ was recovered.

EXAMPLE 5

0.183 g of $(NH_4)_2TiF_6$, produced as in Example 1, and 0.082 g of NaF were dissolved in 15 ml of water. 40 ml of methanol was added and this produced a white precipitate of $Na_2TiF_6$. The solid was collected by filtration, washed with methanol and dried in air at 120° C. The mass of $Na_2TiF_6$ recovered was 0.147 g.

EXAMPLE 6

0.274 g of $(NH_4)_2TiF_6$, produced as in Example 1, and 0.258 g of $NaNO_3$ were dissolved together in 10 ml of water. Addition of 50 ml of methanol resulted in the precipitation of $Na_2TiF_6$ as a white powder. After filtration, washing with methanol and drying in air at 120° C., the mass of $Na_2TiF_6$ recovered was 0.247 g.

EXAMPLE 7

0.318 g of $(NH_4)_2TiF_6$, produced as in Example 1, in 5 ml of water was added dropwise to a solution of 0.218 g of KF in 1 ml of water, cooled in an ice bath. The gelatinous white precipitate formed was collected by filtration and washed with 5 ml of ice-cold water to remove KF. Drying at 105° C. yielded 0.287 g of anhydrous pure $K_2TiF_6$. The filtrate was reduced by boiling to one-third of its volume and cooled to 0° C. A second yield of 0.088 g of $K_2TiF_6$ was collected. Overall, the conversion rate of $(NH_4)_2TiF_6$ to $K_2TiF_6$ was 97%. Under process conditions, product recovery could be optimised by using a solution saturated with $K_2TiF_6$ throughout.

EXAMPLE 8

0.1232 g of $(NH_4)_2TiF_6$, produced as in Example 1, was pyrohydrolysed at 200°–250° C. for 5 hours. The weight of hydrated $TiO_2$ after pyrohydrolysis was 0.0524 g, representing a nominal recovery of 105%. When this material was dehydrated by calcining, the weight of $TiO_2$ was 0.0499 g, representing 100.4% recovery. Analysis for total fluoride in the $NH_4HF_2$ sublimate and in the aqueous condensate containing HF indicated 99.3% recovery.

EXAMPLE 9

Three pyrohydrolyses of the compound $(NH_4)_3ZrF_7$, which was produced in a similar manner as outlined in Example 1, for periods of 4 to 5 hours at 450°–500° C., gave recoveries of 99%, 101% and 103% for $ZrO_2$ and 99%, 102% and 104% for total fluoride.

EXAMPLE 10

0.115 g of $SiO_2$ was added to a stirred solution of ammonium hydrogen difluoride (0.507 g) in methanol (30 ml). The mixture was stirred at room temperature for 3 hours after which time the liquid was separated from the solid by decanting. The residue was washed three times with methanol (3×30 ml) and then dried in air at room temperature. The mass of white powder $(NH_4)_2SiF_6$ was 0.318 g (93% conversion).

EXAMPLE 11

0.050 g of sodium fluoride was added to a stirred solution of ammonium hexafluorosilicate (0.107 g) in water (5 ml). A gelatinous white precipitate was formed immediately. The solid was allowed to settle and the solution was removed by decanting. After washing with 20 ml of methanol and drying in air, the mass of solid recovered was 0.069 g. The methanol washing (20 ml) was added to the original solution (5 ml) to precipitate a further quantity of solid. The residue was again separated from the liquid by decanting, washed with methanol (15 ml) and air dried to give a further 0.35 g of $Na_2SiF_6$. The total $Na_2SiF_6$ mass was 0.104 g and the overall conversion was 92%.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

We claim:

1. A process for the production of fluorometallate salts useful in the processing of mineral sands and related materials comprising:
   (a) dissolving a molecular binary metal fluoride in an organic solvent; and
   (b) adding the metal fluoride dissolved in the organic solvent in step (a) to an alkali fluoride dissolved in water or in aqueous hydrogen fluoride to produce an alkali fluorometallate.

2. A process as claimed in claim 1 wherein the process comprises separating the organic solvent from the product of step (b) and recycling the organic solvent to step (a).

3. A process as claimed in claim 1 wherein the metal fluoride is selected from the group consisting of titanium tetrafluoride, zirconium tetrafluoride and tin tetrafluoride.

4. A process as claimed in claim 1 wherein the organic solvent in step (a) is an alcohol or another non-aqueous medium in which contaminants are insoluble.

5. A process as claimed in claim 4 wherein the alcohol is selected from the group consisting of methanol, ethanol and isopropanol.

6. A process as claimed in claim 1 wherein the alkali fluoride of step (b) is potassium fluoride (KF), sodium fluoride (NaF) or lithium fluoride (LiF).

7. A process as claimed in claim 1 wherein the alkali fluorometallate produced in step (b) is selected from the group consisting of $K_2TiF_6$, $Na_2TiF_6$, $Li_2TiF_6$, $K_2ZrF_6$, $Na_2ZrF_6$, $Li_2ZrF_6$, $K_2SnF_6$, $Na_2SnF_6$, $Li_2SnF_6$, $K_3ZrF_7$, $Na_3ZrF_7$ and $Li_3ZrF_7$.

8. A process according to claim 1 wherein the process comprises adding water and optionally base to the metal fluoride dissolved in the organic solvent in step (a) to produce a hydrated metal oxide.

9. A process for the production of fluorometallate salts useful in the processing of mineral sands and related materials comprising:
   (a) dissolving a molecular binary metal chloride in an organic solvent;
   (b) adding an ammonium fluoride to the metal chloride dissolved in the organic solvent in step (a) in the absence of water to precipitate an ammonium fluorometallate from the organic solvent; and
   (c) dissolving the ammonium fluorometallate from step (b) in water and adding an alkali fluoride, alkali chloride or an alkali nitrate to the ammonium fluorometallate dissolved in water to produce an alkali fluorometallate and an ammonium fluoride, ammonium chloride or an ammonium nitrate.

10. A process as claimed in claim 9 wherein the process comprises separating the organic solvent from the product of step (b) and recycling the organic solvent to step (a).

11. A process as claimed in claim 9 or claim 10 wherein, in step (c), the process comprises adding alkali fluoride to produce alkali fluorometallate and ammonium fluoride, and separating the ammonium fluoride so produced and recycling the ammonium fluoride to step (b).

12. A process as claimed in claim 9 wherein the metal chloride is selected from the group consisting of titanium tetrachloride, zirconium tetrachloride and tin tetrachloride.

13. A process as claimed in claim 9 wherein the organic solvent in step (a) is an alcohol or another non-aqueous medium in which contaminants are insoluble.

14. A process as claimed in claim 13 wherein the alcohol is selected from the group consisting of methanol, ethanol and isopropanol.

15. A process as claimed in claim 9 wherein the ammonium fluoride in step (b) is selected from ammonium fluoride ($NH_4F$) and ammonium bifluoride ($NH_4HF_2$).

16. A process as claimed in claim 9 wherein the ammonium fluorometallate produced in step (b) is ammonium fluorotitanate, ammonium fluorozirconate or ammonium fluorostannate.

17. A process as claimed in claim 16 wherein the ammonium fluorotitanate is ammonium hexafluorotitanate $(NH_4)_2TiF_6$.

18. A process as claimed in claim 16 wherein the ammonium fluorozirconate is selected from the group consisting of heptafluorozirconate ammonium ($(NH_4)_3ZrF_7$) and ammonium hexafluorozirconate ($(NH_4)_2ZrF_6$).

19. A process as claimed in claim 16 wherein the ammonium fluorostannate is ammonium hexafluorostannate ($(NH_4)_2SnF_6$).

20. A process as claimed in claim 9 wherein the alkali fluoride added in step (c) is potassium fluoride (KF), sodium fluoride (NaF) or lithium fluoride (LiF).

21. A process as claimed in claim 9 wherein the alkali fluorometallate produced in step (c) is selected from the group consisting of $K_2TiF_6$, $Na_2TiF_6$, $Li_2TiF_6$, $K_2ZrF_6$, $Na_2ZrF_6$, $Li_2ZrF_6$, $K_2SnF_6$, $Na_2SnF_6$, $Li_2SnF_6$, $K_3ZrF_7$, $Na_3ZrF_7$ and $Li_3ZrF_7$.

22. A process as claimed in claim 9 wherein the process comprises isolating the alkali fluorometallate from step (c) by adding an organic solvent or another non-aqueous medium miscible with water to precipitate the alkali fluorometallate.

23. A process as claimed in claim 22 wherein the organic solvent is an alcohol.

24. A process as claimed in claim 23 wherein the alcohol is selected from the group consisting of methanol, ethanol and isopropanol.

25. A process a claimed in claim 9 wherein the process comprises pyrohydrolyzing the ammonium fluorometallate produced in step (b) to produce a hydrated metal oxide, an ammonium fluoride and hydrogen fluoride.

26. A process as claimed in claim 25 wherein the process comprises separating ammonium fluoride and recycling the ammonium fluoride to step (b).

27. A process as claimed in claim 25 or claim 26 wherein the process comprises separating hydrogen fluoride and reacting the hydrogen fluoride with silicon dioxide and an alkali fluoride to produce an alkali fluorosilicate.

28. A process as claimed in claim 13 wherein the process comprises reacting ammonium fluoride dissolved in an alcohol with silicon dioxide to produce ammonium fluorosilicate.

29. A process as claimed in claim 28 wherein the process comprises dissolving ammonium fluorosilicate in water and reacting the ammonium fluorosilicate with an alkali fluoride to produce an alkali fluorosilicate.

30. A process as claimed in claim 27 wherein the process comprises heating alkali fluorosilicate to produce silicon tetrafluoride and recycling an alkali fluoride and the alkali fluoride to step (c).

31. A process as claimed in claim 29 wherein the process comprises heating alkali fluorosilicate to produce silicon tetrafluoride and an alkali fluoride and recycling the alkali fluoride to step (c).

* * * * *